US012151903B2

(12) United States Patent
Osswald et al.

(10) Patent No.: US 12,151,903 B2
(45) Date of Patent: Nov. 26, 2024

(54) TRANSPORT UNIT FOR TRANSPORTING AEROSOL CANS AND METHOD FOR OPERATING A TRANSPORT UNIT

(71) Applicant: Hinterkopf GmbH, Eislingen/Fils (DE)

(72) Inventors: Steffen Osswald, Geislingen (DE); Alexander Grieser, Böhmenkirch (DE)

(73) Assignee: Hinterkopf GmbH, Eislingen/Fils (DE)

(*) Notice: Subject to any disclaimer, the term of this patent is extended or adjusted under 35 U.S.C. 154(b) by 475 days.

(21) Appl. No.: 17/551,500

(22) Filed: Dec. 15, 2021

(65) Prior Publication Data

US 2022/0185598 A1     Jun. 16, 2022

(30) Foreign Application Priority Data

Dec. 15, 2020  (EP) .................................... 20020621

(51) Int. Cl.
*B65G 47/86* (2006.01)
(52) U.S. Cl.
CPC .... *B65G 47/847* (2013.01); *B65G 2201/0252* (2013.01)
(58) Field of Classification Search
CPC .................... B65G 47/847; B65G 2201/0252
See application file for complete search history.

(56) References Cited

U.S. PATENT DOCUMENTS

| 9,346,629 B2* | 5/2016 | Luz .................. B65G 47/91 |
| 2014/0352612 A1* | 12/2014 | Persico ............... B05B 13/0609 |
| | | 198/339.1 |

FOREIGN PATENT DOCUMENTS

| DE | 102012101076 A1 | 8/2013 |
| DE | 202012009837 U1 | 1/2014 |
| DE | 102017219503 A1 | 5/2019 |
| EP | 2562103 A1 | 2/2013 |
| EP | 2808277 A1 | 12/2014 |
| EP | 2987605 A1 | 2/2016 |
| EP | 3339222 A1 | 6/2018 |

* cited by examiner

*Primary Examiner* — Gene O Crawford
*Assistant Examiner* — Lester Rushin, III
(74) *Attorney, Agent, or Firm* — Hoffmann & Baron, LLP

(57) ABSTRACT

Transport unit for transporting circular-cylindrical profiled workpieces, including a loading drum which is rotatably mounted about an axis of rotation on a bearing journal and which is provided on an outer surface with a plurality of loading slides, wherein each loading slide is received on the outer surface so as to be linearly movable along the axis of rotation and has a workholder with a recess profiled in the form of a circular section along the axis of rotation, wherein profile axes of the recesses each intersect a circumference arranged coaxially to the axis of rotation and wherein it is provided that the workholder is received on the loading slide so as to be linearly movable along a radial direction aligned perpendicularly to the axis of rotation between a radially inner first functional position and a radially outer second functional position.

14 Claims, 3 Drawing Sheets

TRANSPORT UNIT FOR TRANSPORTING AEROSOL CANS AND METHOD FOR OPERATING A TRANSPORT UNIT

BACKGROUND OF THE INVENTION

The invention relates to a transport unit for transporting aerosol cans or other circular-cylindrically profiled workpieces. The transport unit comprises a loading drum which is mounted rotatably about an axis of rotation on a bearing journal and which is provided on an outer surface with a plurality of loading slides, wherein each loading slide is received on the outer surface so as to be linearly movable along the axis of rotation and comprises a workholder, wherein the workholder is provided with a recess having a profile, in particular a concave profile in the form of a section of a circle, and wherein an axis of the profile, which axis is named a profile axis, is oriented parallel to the axis of rotation and wherein profile axes of the recesses of the workholders each intersect a circle, in particular a circumference, arranged coaxially with the axis of rotation. Furthermore, the invention relates to a method for operating a transport unit.

SUMMARY OF THE INVENTION

The task of the invention is to provide a transport unit and a method for operating a transport unit, with which the risk of damage to the workpieces during the transport process is reduced.

This task is solved for a transport unit as mentioned above in that the workholder is received on the loading slide so as to be linearly movable along a radial direction which is oriented perpendicularly to the axis of rotation. The workholder is moveable between a radially inner first functional position and a radially outer second functional position.

The task of the loading slides, which are accommodated on the loading drum so that they can move linearly and are each provided with a workholder, is to pick up workpieces from an upstream transport system, which is designed for feeding workpieces in a timed manner or in a continuous manner to the transport unit, and/or to discharge workpieces to a downstream transport system, which is designed for removing workpieces in a timed manner or in a continuous manner from the transport unit. In this context, the loading drum is also referred to as a transfer system.

The workpiece pick-up operation and/or the workpiece discharge operation requires a linear relative movement between the workpiece which is placed on the workholder of the loading slide and the upstream transport system and/or the downstream transport system. Exemplarily the workpiece is cup-shaped, in particular the workpiece is an aerosol can blank made of metal, or a tube blank made of metal or plastic.

Typically the workpiece is pushed onto a mandrel of the upstream transport system or is inserted into a chuck of the upstream transport system and thus a linear relative movement of the loading slide and the workholder with respect to the axis of the loading drum is required for picking up, in particular for pulling off, the workpiece from the upstream transport system. Furthermore a delivery of the workpiece to a downstream transport system may require a pushing of the workpiece onto a mandrel of the downstream transport system or a pushing of the workpiece into a chuck of the downstream transport system. This pushing operation for the workpiece also requires a linear relative movement of the loading slide and the workholder along the axis of rotation of the loading drum.

In order to ensure that the workpiece is transported as gently as possible, the workholder is designed to come into contact with an outer surface, in particular an outer circumferential surface, of the workpiece and to ensure adhesion of the workpiece to the workholder by using negative pressure or magnetic forces. Typically the outer surface of the workpiece is substantially circular-cylindrical in shape and the profile of the recess in the workholder has a receiving geometry adapted to this outer surface.

Preferably, the receiving geometry is formed at least geometrically similar, in particular geometrically identical, to a partial area of the outer surface of the workpiece. Therefore the recess of the workholder extends along a profile axis which is aligned parallel to the axis of rotation of the loading drum and the recess is realized with a profile that is constant along the profile axis or at least along a section of the profile axis. Purely by way of example, it can be provided that this profile is formed as a circular section in a cross-sectional plane oriented normal to the axis of rotation. In this case, a radius of this circular section defining the profile of the recess corresponds at least almost to a radius of the circular-cylindrical outer surface of the workpiece. Due to the at least substantial geometric identity between a partial area of the outer surface of the workpiece and the recess in the workholder the contact between the workholder and the workpiece allows adherence of the workpiece to the workholder by utilizing negative pressure and/or magnetic forces.

In order to facilitate the process of picking up a workpiece from an upstream transport system or the process of delivering the workpiece to a downstream transport system, it is additionally provided that the workholder can perform a linear relative movement with respect to the loading slide in a radial direction, which radial direction is to aligned perpendicularly to the axis of rotation of the loading drum. This linear relative movement between the first functional position and the second functional position results in a change, in particular in an increase, in distance between the workholder and the loading slide or the axis of rotation of the loading drum.

The position at which a minimum distance between workholder and loading slide or between the workholder and the axis of rotation is ensured is referred to as the first functional position. The position in which there is a maximum distance between the workholder and the loading slide or between the workholder and the rotation axis is ensured is referred to as the second functional position.

By way of example, it is assumed that a movement stroke between the first functional position and the second functional position is smaller than the radius of the recess in the workholder.

This possibility of changing the distance between the workholder and the axis of rotation of the loading drum facilitates, for example, a pickup of a workpiece from an upstream transport system in which the workpiece is held in the same way as at the loading drum only at its circular cylindrical outer surface. In this connection, it is provided that the workholder, in a transfer position or loading position between the upstream transport system and the loading drum, is moved closer to the upstream transport system in the radial direction in order to allow adhesion of the workpiece to the workholder in the second functional position and then to return to the first functional position in order to increase the distance to the upstream transport system again.

Such a procedure is of particular interest if the loading drum and the upstream transport system have different conveying speeds, since a contact time in which the workpiece is in contact with both the upstream transport system and the workholder can thus be minimized.

The upstream transport system can be designed, for example, as a conveyor belt, as a chain conveyor, as a workpiece rotary table with chucks or pick-up mandrels attached to it or as a take-off drum in the manner of the loading drum. In the same way, a delivery of the workpiece from the loading drum to a downstream transport system can also be supported by the linear relative movement of the workholder with respect to the loading slide.

With regard to the arrangement of the loading slides with the respectively assigned workholders on the loading drum, it is assumed that the profile axes of the recesses formed in the respective workholders intersect a circle, in particular a circumference, which is aligned coaxially with the axis of rotation, provided that the workholders are each in the first functional position. If one of the workholders is moved from the first functional position to the second functional position, the condition that the profile axis of this workholder intersects the circumference, which is aligned coaxially with the axis of rotation, is temporarily not fulfilled for this workholder.

The rotational movement required for the pick-up of workpieces and for the delivery of workpieces by means of the loading drum can optionally be carried out as a continuous rotation or as a rotational step movement with a sequence of rotational steps and movement pauses.

Advantageous further embodiments of the invention are the subject of the subclaims.

It is expedient if the loading drum is provided on the outer surface with a plurality of linear guides, each aligned parallel to the axis of rotation, and that the loading slides are moveably guided in these linear guides.

The task of the linear guide, which can have, for example, one or more guide rods or guide rails aligned parallel to the axis of rotation of the loading drum or a guide profile extending parallel to the axis of rotation of the loading drum, in particular in the form of a dovetail guide, lies primarily in the precise guidance of the loading slide and the workholder attached thereto parallel to the axis of rotation of the loading drum. The bearing of the loading slide on the linear guide can be realized as a plain bearing or as a roller bearing or as a combination thereof.

In addition to the guiding tasks it can be provided that the linear guide and the loading slide are adapted to each other in such a way that a supply of electrical energy and/or of a pressurized fluid, in particular compressed air, and/or of negative pressure, from the linear guide to the loading slide is enabled. With the provided electrical energy and/or the provided pressurized fluid, for example, the radial displacement of the workholder between the first rotational position and the second functional position can be effected. With the provision of negative pressure to the loading slide, under the condition to of a suitable channel arrangement in the loading slide as well as in the workholder, suction of the workpiece into the recess of the workholder can be realized. In addition, a sensor can be provided on the loading slide and/or the workholder which may be used to detect the presence of a workpiece in the recess. Sensor signals from this sensor can be transmitted from the workholder or loading slide via the linear guide to the loading drum and from there to an evaluation device, in particular to an electronic control.

It is advantageous if the loading slide is assigned an actuator, in particular a pneumatic cylinder or an electric actuator, which is designed to provide a relative movement between the loading slide and the workholder.

The relative movement between the workholder and the loading slide can be predetermined and, if necessary, varied by means of the actuator, both with regard to the time or place at which this relative movement is carried out during a rotation or a standstill of the loading drum. In addition, the course of the movement can also be predetermined and, if necessary, varied with regard to a maximum acceleration and/or duration of the movement.

In particular, the actuator can be designed as a pneumatically operated short-stroke cylinder or as an electrically operated magnetic drive or as an electric motor with a downstream gearbox for converting of a rotational movement of a motor shaft into a linear movement. Preferably, an actuator housing of the actuator is accommodated in the loading slide and an actuator element, which is moveably mounted in the actuator housing for relative movement is in operative connection with the workholder. In order to ensure advantageous guidance of the workholder relative to the loading slide during the radial movement, additional guide means can be provided, for example guide journals formed on the workholder, which are mounted so as to be linearly movable in corresponding guide bores in the loading slide.

In an alternative embodiment, it is provided that instead of the actuator, a control cam formed on the bearing journal is designed to influence the radial position of the workholder relative to the loading slide.

In a further development of the invention, it is provided that a circular guide track or guide slot is fixed to the bearing journal, in particular in an inner space bounded by the loading drum, which guide track determines a guide path aligned circumferentially with respect to the axis of rotation, and wherein each loading slide has a radially inwardly directed guide journal which is designed for positive engagement with the guide track along the axis of rotation of the loading drum, the guide track having a recess which is designed for decoupling the guide journal from the guide track at a predetermined circumferential position. The task of the guide track is to allow a relative movement along the axis of rotation for the loading slide with the workholder received thereon relative to the respective linear guide only at a, in particular exactly one, predetermined position which the loading slide can assume as a result of the rotation of the loading drum about the axis of rotation.

By way of example, it is provided that the loading slide with the workholder is to perform a linear movement along the axis of rotation only at a loading position at which the workholder is opposite, in particular at a minimum distance, an adjacently arranged upstream transport system and/or at an unloading position at which the workholder is opposite, in particular at a minimum distance, an adjacently arranged downstream transport system. In all other rotational positions which the respective loading slide can assume as a result of the rotational movement of the loading drum the guide track prevents a linear movement of the loading slide along the axis of rotation. Accordingly, the guide track can be provided, for example, at the loading position and/or at the unloading position with a recess which enables the guide journal, which is attached to the loading slide and engages positively in the guide track, to be disengaged precisely in this respective position.

If the linear movement of the loading slide is carried out at the respective loading or unloading position during a standstill of the loading drum, it is sufficient if the recess in the guide track is only slightly larger than a cross section of the guide journal.

If, on the other hand, the linear movement of the loading slide is to be started before the respective loading or unloading position has been reached and/or is to be terminated only after leaving the respective loading or unloading position, it must be ensured that the recess in the guide track extends over the angular range over which the loading slide can deviate from the axial position specified by the guide track.

Preferably, the guide track is such that the loading slides always assume the same to axial position during rotation of the loading drum. Alternatively, it can also be provided that the guide track is designed in such a way that the loading slides can also carry out an axial displacement in the course of the rotation of the loading drum without the guide effect being cancelled by the guide track for this purpose.

If, in an alternative embodiment, it is provided that the linear guide together with the loading slide forms a linear drive, which can be controlled electrically or is designed as a pneumatic cylinder, for example, the guide track can be omitted and individual axial positioning of the respective loading slide can be realized.

In one embodiment of the invention, it is provided that the bearing journal for the loading drum is arranged together with a pusher on a machine frame, and that the pusher is designed for introducing a linear movement along the axis of rotation onto a respective loading slide. By way of example, the pusher comprises an extension arm which can perform a linear movement aligned parallel to the axis of rotation and which is designed for a temporary mechanical coupling with the loading slide and/or the workpiece held on the workholder. In this way at an unloading position, the loading slide with the workholder attached to it and the workpiece received on the workholder can be approached to a downstream transport system in order to transfer the workpiece to the downstream transport system. Exemplarily, it can be provided that the extension arm is formed as a component of the downstream transport system and can perform an alternating stroke movement along the axis of rotation of the loading drum during a conveying movement of the downstream transport system in order to effect a synchronized linear movement of the loading slides.

It is preferably provided that the pusher comprises a linear drive, in particular a pneumatic cylinder or an electric actuator. The linear drive comprises a drive housing and drive rod which is mounted linearly movably in the drive housing. The extension arm, which is aligned perpendicularly to the axis of rotation of the loading drum, is connected with the drive rod and is designed for a movement coupling with the workholder and for a movement initiation onto the workpiece. With such a design of the pusher, it is possible to influence the linear movement of the loading slide and the workholder attached thereto and the workpiece received thereon independently of a conveying movement of an upstream or downstream transport system, but in particular synchronized with the respective conveying to movement. This enables advantageous adaptation of the linear movement of the loading slide to the requirements of the upstream or downstream transport system.

In principle, it is assumed that the drive housing of the linear drive, which is part of the pusher, is attached to the machine frame to which the bearing journal of the loading drum is also fixed. In this case, the drive rod of the linear drive performs the linear relative movement with which the loading slide is moved along the axis of rotation of the loading drum. Preferably, a transmission of force from the extension arm to the loading slide and the workpiece is realized by a form fit between the extension arm and the loading slide and/or the workpiece. Supplementary or alternatively, a frictional force transmission or, if necessary, the use of magnetic forces or negative pressure can also be used for a force transmission between the extension arm, loading slide and workpiece.

It is advantageous if a compressed air supply and/or a power supply and/or a vacuum supply are assigned to the loading drum for a movement of the loading slide along the axis of rotation and/or for a temporary adhesion of workpieces to the workholders. It is particularly advantageous if a rotary feedthrough for the compressed air supply and/or power supply and/or vacuum supply of the components formed on the loading drum is arranged on the bearing journal for the loading drum and/or on an end face of the loading drum facing away from the machine frame.

It is expedient if a transport system from the group: take-off drum with transport trays, chain conveyor with chain bars, workpiece rotary table with holding mandrels, workpiece rotary table with chucks, is arranged adjacent to the loading drum. A take-off drum with transport trays has essentially the same configuration as the loading drum and can be used, for example, to remove workpieces from a chain conveyor and deliver them to the loading drum. A chain conveyor has an endless circulating chain to which a plurality of chain bars are attached to allow hollow cylindrical workpieces to be attached with their open ends to the chain bars. A chain conveyor is used for bridging longer distances between different processing machines, for example for transporting workpieces between a brushing machine for brushing the surface of the workpieces and a printing machine for printing the workpieces. Depending on the configuration, the loading drum can be used directly to pull-off the workpieces from the chain bars of the chain conveyor or serves to transfer the workpieces to the processing machine, while a pull-off of the workpieces from upstream chain conveyors is performed by means of an intermediate pull-off drum. Furthermore, it can be provided by way of example that a processing machine such as a printing machine is equipped with a workpiece rotary table which, in order to carry out the processing operation, in particular the printing operation, can be rotated in the course of a rotary step movement about an axis of rotation which is aligned parallel to the axis of rotation of the loading drum. A number of chucks or collets are arranged on the workpiece rotary table on a circle aligned coaxially with the axis of rotation of the workpiece rotary table. Preferably these chucks or collets are arranged with the same angular pitch, and are designed to hold workpieces in place. For a transfer of the workpieces from the loading drum into the respective collets, the linear movement of the loading slide with the workholder attached thereto and the workpiece received thereon is provided along the axis of rotation.

In an alternative embodiment of a workpiece rotary table, which is mounted on the machine frame so as to be rotatably movable about an axis of rotation, a plurality of receiving mandrels are provided on a front side of the workpiece rotary table, in particular arranged in equal pitch on a pitch circle arranged coaxially to the axis of rotation, wherein a nozzle for providing compressed air at a surface of the receiving mandrel is associated with at least one receiving mandrel. Preferably all mandrels are equipped with such nozzles. Whereas the chain bars of a chain conveyor each have an outer diameter which is considerably smaller than an inner diameter of the recess of the sleeve-shaped workpiece, an outer diameter of the receiving mandrels corresponds at least substantially to the inner diameter of the workpiece. This enables precise guidance of the workpiece and introduction of a torque onto the workpiece, which is important, for example, for carrying out a printing process, in particular when using a screen printing process or an offset printing process for printing on the workpiece.

In view of the outer diameter of the mandrel and the inner diameter of the workpiece, which are preferably adapted to one another as a clearance fit or transition fit, it is advantageous for the pushing the workpiece onto the mandrel if an air cushion is formed between the workpiece and the mandrel at least temporarily during the execution of the pushing-on process. This can be achieved, for example, by providing a flow of air into the gap between the workpiece and the mandrel by means of a suitable nozzle mounted on the machine frame or on the workpiece rotary table. Alternatively, it is provided that a fluid channel is formed in the mandrel, which has at least one nozzle opening at a circular cylindrical outer surface of the mandrel, so that a provision of compressed air can be made directly in the gap between the outer surface of the mandrel and the inner surface of the workpiece. Preferably the air flow is provided exclusively during the execution of the push-on process and, in particular, is already switched off before the push-on process is completely finished in order to avoid an undesired displacement of the workpiece and to limit the consumption of compressed air.

It is preferably provided that a first coupling part of a compressed air coupling is arranged on a rear side of the workpiece rotary table facing away from the front side, which first coupling part is connected to the nozzle via a compressed air line, and that an actuator is attached to the machine frame, which actuator has an actuator housing and an actuator element mounted in the actuator housing so as to be linearly movable, wherein an axis of movement of the actuator element is aligned parallel to the axis of rotation of the loading drum, and wherein a second coupling part of the compressed air coupling is arranged on the actuator element, which second coupling part can be connected to a source of compressed air and is configured in a functional position for a compressed air connection with the first coupling part to provides compressed air to the respective nozzle. The task of the compressed air coupling, which is formed by the first coupling part on the workpiece rotary table and which is assigned to a respective mandrel, and by the second coupling part on the actuator element of the actuator, is to temporarily create a fluid-tight coupling between a fluid line, which is connected to a compressed air source arranged away from the machine frame, and the nozzle of the mandrel which is placed with its first coupling part in front of the second coupling part. Preferably, it is provided that a valve is arranged in the fluid line, which makes it possible to influence the fluid flow between the compressed air source and the nozzle. By way of example, it is provided that the actuator with the second coupling part is arranged opposite the workpiece rotary table in such a way that compressed air is also supplied via the compressed air coupling only in a loading position at which a workpiece is fed onto the respective mandrel of the workpiece rotary table. The second coupling part is coupled to the first coupling part of the mandrel which is located in the loading position. In order to effect a fluid-tight coupling between the first coupling part and the second coupling part, it is provided that the second coupling part performs a linear movement parallel to the axis of rotation of the loading drum and parallel to the axis of rotation of the workpiece rotary table, and the desired fluid-tight coupling is produced in the course of an approach to the first coupling part. Alternatively, compressed air is provided by a compressed air coupling operating in a radial direction and arranged on to an outer circumferential surface of the workpiece rotary table.

The task of the invention is solved for a method for transporting circular-cylindrical profiled workpieces with the following steps: Rotating a loading drum, which is provided with a loading slide on an outer surface, about an axis of rotation into a loading position for the loading slide, providing a workpiece from an upstream transport system to the loading slide, and adhering the workpiece to a workholder of the loading slide, rotating the loading drum into an unloading position for the loading slide and transferring the workpiece from the workholder of the loading slide to a downstream transport system, wherein the workholder is movably mounted on the loading slide and wherein, in the loading position and/or in the unloading position, a relative movement of the workholder is carried out in a radial direction which is oriented perpendicularly (90 degrees) to the axis of rotation in order to change a distance between the workholder and the axis of rotation.

In a further embodiment of the method, it is provided that the workpiece is pushed onto a receiving mandrel of a workpiece rotary table, which is aligned parallel to the axis of rotation, at the unloading position by a linear movement of the workholder parallel to the axis of rotation, and that, while the pushing-on process is being carried out, a relative movement of the workholder is carried out in the radial direction in order to reduce the radial distance between the workholder and the axis of rotation.

In a further embodiment of the method, it is provided that during the performance of the push-on operation, a provision of compressed air is performed at a surface of the receiving mandrel.

Preferably it is provided that the relative movement of the workholder in the radial direction for reducing the radial distance of the workholder from the axis of rotation is performed when there is a predetermined overlap between the workpiece and the receiving mandrel and/or that a provision of compressed air to the workpiece receiving means is performed before the time or at the time of the relative movement of the workholder in the radial direction for reducing the radial distance of the workholder from the axis of rotation.

In an advantageous further embodiment of the method, it is provided that, at the loading position for receiving the workpiece into the workholder, a first relative movement of the workholder in the radial direction is carried out in order to increase the radial distance of the workholder from the axis of rotation, and subsequently a second relative movement of the workholder in the opposite radial direction is carried out in order to reduce the radial distance of the workholder from the axis of rotation.

BRIEF DESCRIPTION OF THE DRAWINGS

An advantageous embodiment of the invention is shown in the drawing. Here shows.

DETAILED DESCRIPTION

Figure 1:
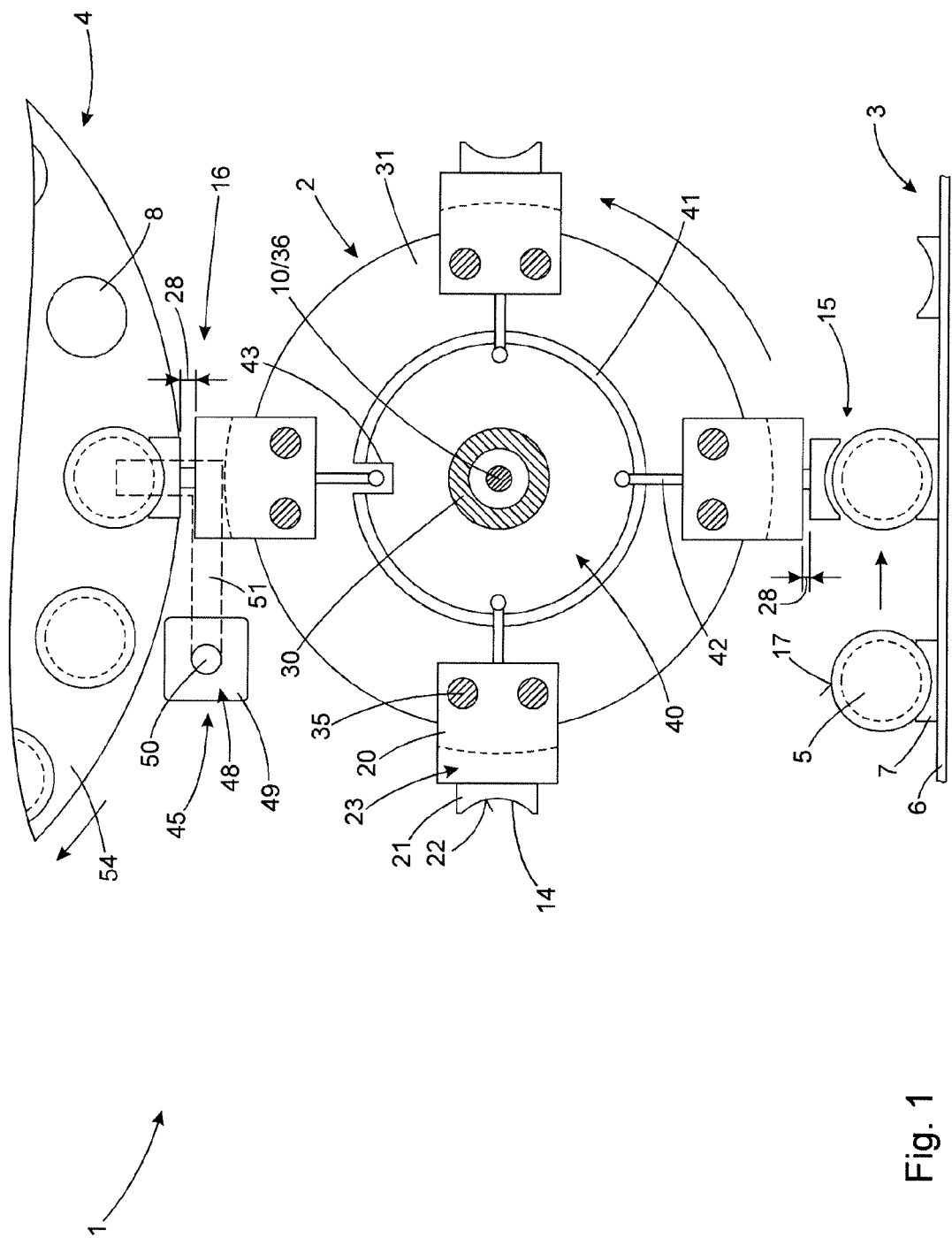
FIG. 1 a schematized front view of a transport unit with a partially cut loading drum, which is arranged between an upstream transport system and a downstream transport system, FIG. 2 a schematized, partially cut top view of the transport unit according to FIG. 1, and FIG. 3 a cutaway detail view of the loading slide according to FIG. 2.

A transport unit 1 shown in FIG. 1 only in schematized, cut-out form and in no way to scale comprises a loading drum 2, a conveyor belt 3 and a workpiece rotary table 4. The transport unit 1 is designed for conveying workpieces 5 with a circular-cylindrical geometry, wherein the workpieces 5 are realized purely exemplarily as hollow cylinders with a bottom attached at the end and are produced, for example, as an aerosol can blank made of aluminum or steel or as tube blanks made of plastic or a metal alloy.

The conveyor belt 3, which is also referred to as the upstream transport system and is only shown area by area, has a flexible belt 6 with workpiece receptacles 7 attached thereto, into which the workpieces 5 can be inserted.

The task of the loading drum 2 is now to pick up the workpieces 5 lying in the workpiece receptacles 7 of the conveyor belt 3 and, in the course of a rotational movement about an axis of rotation 10 aligned perpendicularly to the plane of view of FIG. 1, to deliver them to the workpiece rotary table 4, which can also be referred to as the downstream transport system. On the workpiece rotary table 4, which is only shown in detail in FIG. 1, there are mandrels 8 arranged, preferably in the same angular division. The to mandrels 8 are each of circular-cylindrical design, with center axes 9 of the mandrels 8 each being aligned parallel to the axis of rotation 10 of the loading drum 2 and parallel to an axis of rotation 11 of the workpiece rotary table 4.

Figure 2:
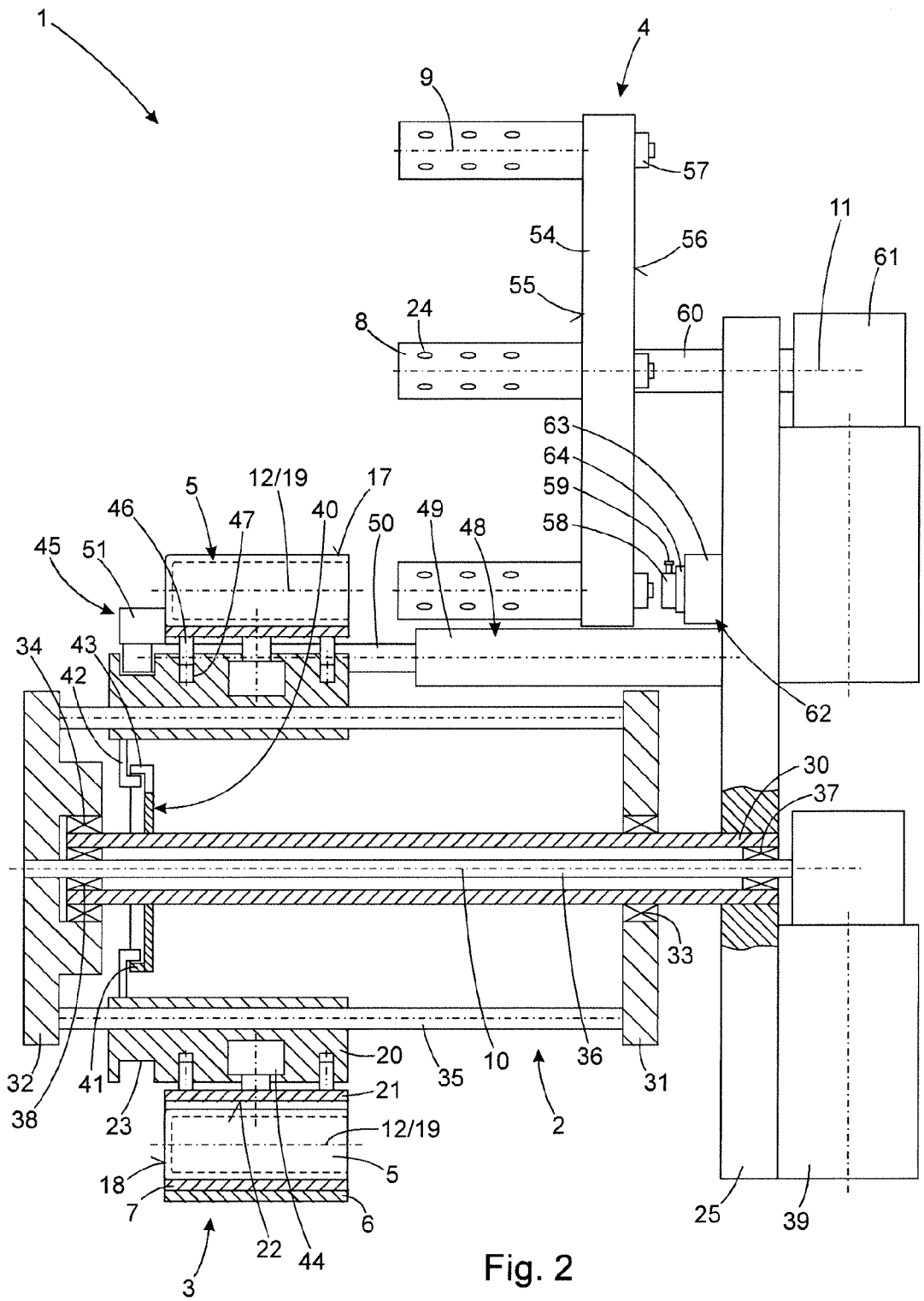

As can be seen from the illustrations of FIGS. 1 and 2, the transport of the workpieces 5 by means of the transport unit 1 takes place in a purely exemplary manner in such a way that a spatial orientation of rotational symmetry axes 12 of the workpieces 5 is not changed when the transport process is carried out, so that the rotational symmetry axes 12 of the workpieces 5 are always aligned parallel to the rotational axis 10 and to the rotational axis 11.

For the transport of the workpieces 5, it is provided that the workpieces 5 initially received in the workpiece receptacles 7 of the conveyor belt 3 are picked up by the loading drum 2 at a loading position 15 and are subsequently transferred to the workpiece rotary table 4 at an unloading position 16 in the course of a rotational movement of the loading drum 2 about the axis of rotation 10.

In order to enable the workpieces 5 to be picked up at the loading position 15 and to prevent undesired relative movements between the workpiece 5, the workpiece receptacle 7 and the loading drum 2, the loading slides 20 and respective workholders 21 associated with the loading slides 20 are designed in such a way that, when the loading position 15 is reached, the workholder 21 can be moved from a first functional position, which the workholder 21 assumes away from the loading position 15 and the unloading position 16, into a second functional position. In the second functional position, the workholder 21 has an increased distance 28 relative to the loading slide 20 and thus also relative to the axis of rotation 10.

As can be seen from the representation of FIG. 1, the workholder 21 is transferred from the first functional position to the second functional position at the loading position 15 in the radial direction. According to the illustration of FIG. 1, the workholder 21 just assumes an intermediate position in which the distance 28 does not yet have the maximum value defined by the design and in which there is still no contact with the outer surface 17 of the workpiece 5, which is of circular-cylindrical design purely as an example.

For receiving the workpiece 5, it is preferably provided that the workholder 21 has a recess 14, which recess is profiled along a profile axis 19 parallel to the axis of rotation 10 in the shape of a segment of a circle. This recess 14 forms a concave contact surface 22 to which negative pressure can be applied, causing the workpiece 5 to adhere to the workholder 21 as soon as there is a surface contact between the contact surface 22 and the outer surface 17 of the workpiece 5. Subsequently, the workholder 21 with the workpiece 5 received thereon is displaced inward in the radial direction so that the workpiece 5 is lifted off the workpiece receptacle 7 and no undesired relative movement between the workpiece 5 and the workpiece receptacle 7 of the conveyor belt 3 can occur during a subsequent rotational movement of the loading drum 2.

Subsequently, a rotation of the loading drum 2 takes place in order to transport the workpiece 5 picked up by the conveyor belt 3 to the unloading position 16 and to push it there onto the mandrel 8 of the workpiece rotary table 4. By way of example, the workpiece rotary table 4 can be designed as a component of a processing machine not shown in greater detail, such as a printing machine for printing the outer surface 17 of the workpiece 5. For the transfer of the workpiece 5 from the loading drum 2 to the mandrel 8 of the workpiece rotary table 4, a linear movement of the loading slide 20 with the workholder 21 attached thereto and the workpiece 5 received thereon is provided parallel to the axis of rotation 10. Furthermore, it can be provided that during the execution of the pushing-on process for the workpiece 5 onto the mandrel 8, in order to avoid undesired relative movements between the workholder 21 and the workpiece 5, a radially inwardly directed retraction movement of the workholder 21 is performed, in the course of which the negative pressure provided at the contact surface 22 is also switched off.

Preferably, it is provided that the conveyor belt 3 performs a continuous conveying movement, while the loading drum 2 and the workpiece rotary table 4 each perform rotational step movements which are synchronous with one another and which may also be referred to as intermittent rotational movements.

Figure 3:
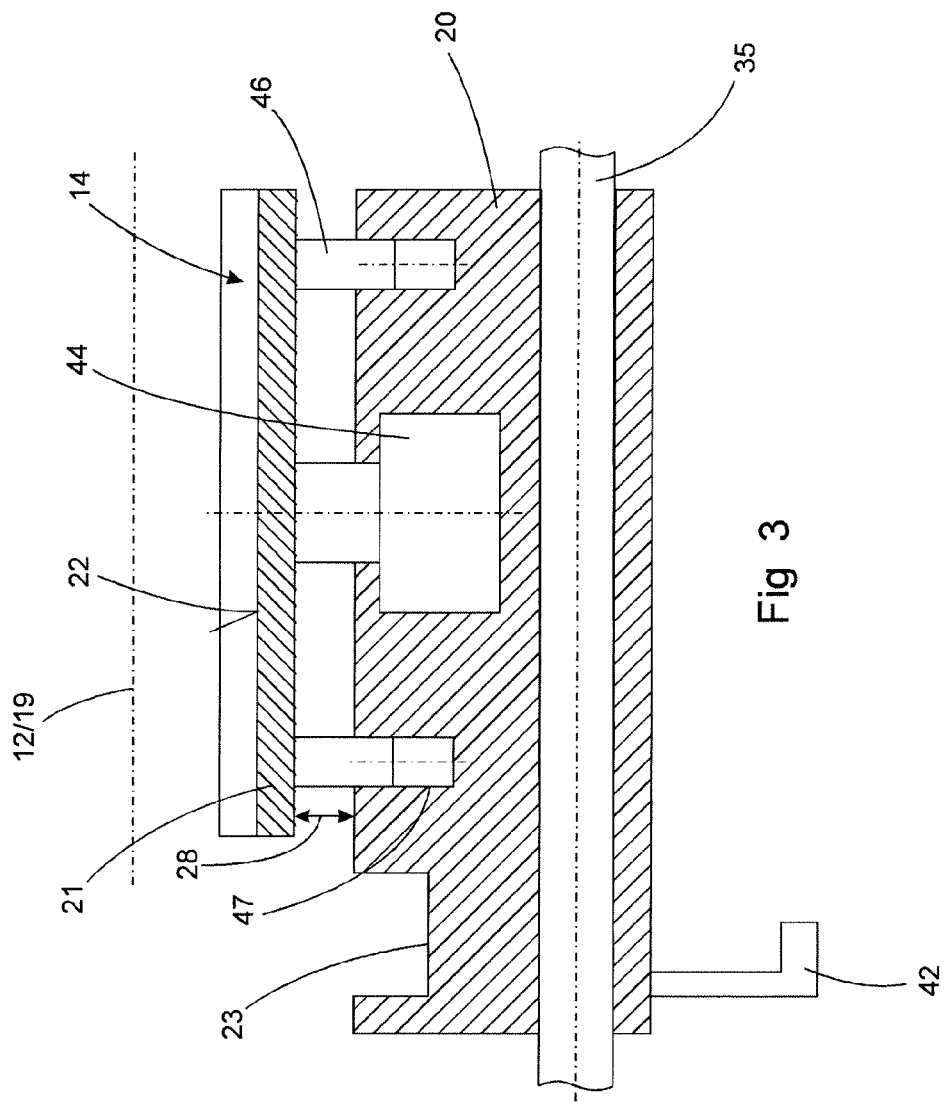

In the likewise purely schematic and by no means to-scale representation of FIG. 2 the internal structure of the loading drum 2 is shown in more detail. FIG. 3 contains an enlarged representation of the loading slide 20 shown in FIG. 2 as a component of the loading drum 2 and of the workholder 21 attached thereto.

Purely by way of example, according to the illustration in FIG. 2, a bearing journal 30 of the loading drum 2 is fixed and a drive shaft 60 of the workpiece rotary table 4 is rotatably mounted on a common machine frame 25. However, this applies only to illustrate the flux of force between the loading drum 2 and the workpiece rotary table 4; in practice, it is to be assumed that the loading drum 2 is mounted on a first machine frame and that the workpiece rotary table 4 is mounted on a second machine frame, which are either located on a common hall floor of a workshop or, if necessary, are also directly connected to one another.

Purely by way of example, the bearing journal 30 is tubular in shape and is fixedly connected to the machine frame 25. The loading drum 2 has a first drum disk 31 and a second drum disk 32, which are each rotatably mounted on the bearing journal 30 by means of first and second ball bearings 33, 34 shown symbolically. The first drum disk 31 and the second drum disk 32 are connected to one another in a dimensionally stable and rotationally fixed manner via guide rods 33, with two guide rods 35 serving as linear guides being assigned to each loading slide 20 as shown in FIG. 1. The number of loading slides 20 and corresponding guide rods 35 can be selected as required. Furthermore, a drive shaft 36 extends inside the bearing journal 30 and is rotatably mounted relative to the bearing journal 30 by means of first and second ball bearings 37, 38. The drive shaft 36 connects a drive shaft, not shown in more detail, of a gear motor 39, which is fixed to the machine frame 25, to the second drum disk 32. For this purpose, the drive shaft 36 is connected to the second drum disk 32 in a rotationally fixed manner. Accordingly, the loading drum 2 performs a rotational movement about the axis of rotation 10 when the gear motor 39, which may in particular comprise an electric motor, in particular a servomotor, is suitably controlled.

In principle, the loading slides 20 are freely movable along the guide rods 35, which extend parallel to the axis of rotation 10. However, in order to ensure unambiguous axial positioning for the loading slides 20, a guide track 40 which is formed rotationally symmetrical to the axis of rotation 10 is attached to the bearing journal 30 in a rotationally fixed manner By way of example, a profile of the guide track 40 is designed in such a way that the guide track 40 is formed as a circular disc with an annular collar 41 extending in the axial direction. A radially inwardly extending guide pin or guide journal 42 is formed on each of the loading slides 20, which guide journal 42 extends radially inwardly over the annular collar 41 and which, relative to the axis of rotation 10, enters into a positive coupling with the guide track 40. On the other hand, this geometric design of the guide track 40 and the guide journal 42 does not impair the rotational freedom of movement of the loading drum 2 relative to the guide track 40, which is rigidly connected to the machine frame 25 via the bearing journal 30.

As can be seen from the illustration of FIG. 1, the guide track 40 has a recess 43 which is designed in such a way that the positive coupling between the guide journal 42 and the guide track 40 is cancelled at the unloading position 16. As a result of recess 43 an axial movement of the loading slide 20 with the workholder 21 attached thereto and the workpiece 5 received thereon is enabled at the unloading position 16.

As can be further seen from the illustrations of FIGS. 1 and 2, the loading drum 2 with the loading slides 20 and the workpiece rotary table 4 with the receiving mandrels 8 attached thereto are coordinated with one another in such a way that a radial relative movement of the workholder 21 from the first functional position into the second functional position is performed for a pushing-on operation of the workpiece 5 onto the mandrel 8, which requires a coaxial alignment of the workpiece 5 with respect to the mandrel 8. This radial relative movement is caused by an actuator 44 integrated in the loading slide 20, which can be designed in particular as a pneumatic short-stroke cylinder. For this purpose, the actuator 44 is connected in a manner not shown in more detail to a source of compressed air, which is also not shown and is attached to the machine frame 25. Furthermore a switching valve, which is also not shown, being arranged between the source of compressed air and the actuator 44, with which the release of compressed air is effected in order to transfer the actuator 44 from the first functional position to the second functional position.

By way of example, the actuator 44 is equipped as a single-acting pneumatic cylinder with a resetting device, in particular a helical spring, which is not shown in greater detail, so that when the compressed air supply is switched off and the actuator 44 is vented, an automatic resetting of the workholder 21 from the second functional position to the first functional position is carried out.

In order to ensure reliable guidance of the workholder 21 with respect to the loading slide 20, two guide journals 46 are fixed to the workholder 21 in a purely exemplary manner, which are received in a sliding manner in corresponding guide bores 47 of the loading slide 20.

To initiate a linear movement on the loading slide 20 and to push the workpiece 5 onto the mandrel 8, a pusher 45 is provided, which is fixed to the machine frame 25 in a purely exemplary manner By way of example, the pusher 45 is an assembly which has a pneumatic cylinder 48 with a cylinder housing 49 and a piston rod 50 received in the cylinder housing 49 so as to be linearly movable, as well as an extension arm 51 attached to the end of the piston rod. The cylinder housing 49 is fixed to the machine frame 25, and a pneumatic supply to the pneumatic cylinder 48, which may be in the form of a double-acting pneumatic cylinder, is provided by a compressed air source, not shown, with a downstream valve. The extension arm 51 is provided, on the one hand, to engage in a recess 23 of the loading slide 20 in order to enable initiation of the axial linear movement on the loading slide 20. On the other hand, the extension arm 51 is designed in such a way that it also rests against a bottom region 18 of the workpiece 5 in order to be able to transmit the axial force required to carry out the push-on operation for the workpiece 5 to the mandrel 8.

The workpiece rotary table 4 shown schematically in FIG. 2 comprises, purely by way of example, a base plate 54 of circular disc shape, which is provided with the mandrels 8 on a front side 55. The base plate 54 is connected in a rotationally fixed manner to the drive shaft 60, which in turn is mounted in a rotationally movable manner in the machine frame 25 in a manner not shown in greater detail. Furthermore, the drive shaft is connected to a gear motor 61 which is designed to initiate a rotational movement for the workpiece rotary table 4 about the axis of rotation 11. Exemplarily, first coupling parts 57 are provided on a rear side 56 of the base plate 54 coaxially with the mandrels 8, respectively, and are formed for a fluid-tight connection with a second coupling part 58 which is provided at the end side on an actuator 62. The actuator 62, which may in particular be a pneumatic short-stroke cylinder, comprises an actuator housing 63 fixed to the machine frame 25 and a piston rod 64 mounted for linear movement in the actuator housing, to which the second coupling part 58 is attached at the end. The transmission of the gear motor 61, which is not shown in greater detail, can be designed as a gear transmission or as a stepping transmission.

When suitably pressurized with compressed air, the actuator 62, which is designed in particular as a double-acting pneumatic cylinder, can optionally perform an approach movement or a distance movement relative to the first coupling part 57. In the course of the approaching movement of the second coupling part 58 towards the first coupling part 57, a fluid-tight coupling takes place between the first coupling part 57 and the second coupling part 58, so that compressed air, which can be provided at a compressed air connection 59 of the second coupling part 58, can be provided to the first coupling part 57 and from there to a fluid channel extending in sections through the mandrel 8. Starting from the fluid channel, which is not shown in greater detail, a plurality of radial channels extend in the mandrel 8, which open out at mouth openings 24 of the mandrel 8. By way of example, it is provided that during the performance of a push-on operation for the workpiece 5 onto the mandrel 8, a compressed air supply is performed for the mandrel 8 in order to support a push-on operation of the workpiece 5 onto the mandrel 8 by means of an air film.

The workpieces 5 pushed onto the mandrels 8 can then be fed for further processing by processing stations not shown in more detail in the course of a rotary step movement of the workpiece rotary table 4, and can then be removed from the receiving mandrels again by components of a further transport unit not shown in more detail.

A mode of operation of the transport unit 1 according to FIGS. 1 to 3 can be described as follows:

The workpieces 5 are first transported to the loading position 15 by means of the conveyor belt 3. Herewith it is assumed that the conveyor belt 3 performs a continuous conveying movement. On the other hand, in order to carry out the push-on operation for the workpieces 5, which is executed at the unloading position 16, a temporary standstill is to be provided for the rotational movements of the loading drum 2 and the workpiece rotary table 4, so that both the loading drum 2 and the workpiece rotary table 4 each carry out rotational stepping movements which are synchronized with one another.

Accordingly, it can be assumed that when the workpiece 5 is picked up in the respective workholder 21, a relative movement takes place between the conveyor belt 3, which continues to move continuously, and the workholder 21, since the loading drum 2 is not performing a rotary step movement at this time, but is at rest. An undesired relative movement between the workpiece receptacles 7 of the conveyor belt 3, the workpiece 5 and the workholder 21 can nevertheless be avoided, since the workholder 21 can be briefly transferred in the radial direction outwardly from the first functional position into the to second functional position by appropriate control of the actuator 44 and can thereby quickly receive the workpiece 5. For this purpose, it is provided that the contact surface 22 on the workholder 21 is subjected to negative pressure, so that a lifting off from the workpiece receptacle 7 possibly already takes place before a complete two-dimensional contact between the outer surface 17 of the workpiece 5 and the contact surface 22. This lifting off is allowed due to the rather low weight of the workpiece 5.

Subsequently, the workpiece 5 received at the loading position 15 is transferred to the unloading position 16 in the course of two rotary step movements of 90 degrees each. When the loading slide 20 with the workholder 21 arranged thereon and the workpiece 5 received thereon arrives at the unloading position 16, the extension arm 51 automatically engages in the recess 23 of the loading slide 20 so that a positive coupling between extension arm 51 and loading slide 20 is provided. Furthermore, at this point in time, pressure is applied to the actuator 44 in the loading slide 20 so that the workholder 21 with the workpiece 5 received thereon is transferred from the first functional position to the second functional position. This ensures that the rotational symmetry axis 12 of the workpiece 5 is aligned coaxially with the center axis 9 of the mandrel 8, which enables a push-on process of the workpiece 5 onto the mandrel 8. Subsequently, the pneumatic cylinder 48 is energized, whereby the linear movement of the extension arm 51 and of the loading slide 21 coupled thereto is effected in the direction of the mandrel 8. In addition, the actuator 62 is energized in order to establish the compressed air connection between the first coupling part 57 and the second coupling part 58 and to cause compressed air to be applied to the mouth openings 24 formed on the mandrel 8.

In the course of the pushing process for the workpiece 5 onto the mandrel 8, which is caused by the movement of the extension arm 51 in the direction of the cylinder housing 49, provision can be made to switch off the pressurization of the contact surface 22 of the workholder 21 with negative pressure and to transfer the workholder 21 from the second functional position to the first functional position by suitable control of the actuator 44. This can be done in particular at a time when the workpiece 5 is already received on the mandrel 8 in such a way that reliable guidance for the workpiece 5 is ensured. This measure prevents undesirable relative movements between the workpiece 5 and the workholder 21, which could possibly lead to damage to the outer surface 17 of the workpiece 5. As soon as the workpiece 5 has been pushed onto the mandrel 8, on the one hand the compressed air supply for the mandrel 8 is switched off, which can be caused, for example, by a corresponding control of the actuator 62 and a separation of the second coupling part of the 58 from the first coupling part 57. On the other hand, an extension movement for the piston rod 50 of the pneumatic cylinder 48 takes place, so that the loading slide 20 can return to the initial position according to FIG. 2, in which the guide journal 42 of the loading slide 20 is arranged relative to the guide track 40 in such a way that, during a subsequent rotary step movement of the workpiece rotary table 4 relative to the bearing pin 30 and the guide track 40 fixedly attached thereto, the desired positive locking in the axial direction is ensured for the loading slide 20.

What is claimed is:

1. A transport unit for transporting workpieces, the transport unit comprising a loading drum which is mounted rotatably about an axis of rotation on a bearing journal and which is provided on an outer surface with a plurality of loading slides, each loading slide being accommodated on the outer surface of the loading drum such that it can move linearly along the axis of rotation and each loading slide comprising a workholder, the workholder is provided with a recess which extends with a profile axis parallel to the axis of rotation, wherein the profile axes of the recesses each intersect a circumference arranged coaxially to the axis of rotation, wherein the workholder is received on the loading slide so as to be linearly movable in a radial direction oriented perpendicularly to the axis of rotation between a radially inner first functional position and a radially outer second functional position, wherein a circular guide track is fixed to the bearing journal, which guide track determines a guide path aligned circumferentially with respect to the axis of rotation and wherein each loading slide has a guide journal which is directed radially inwardly an is in positive engagement with the guide track along the axis of rotation, the guide track having a recess for decoupling the guide journal from the guide track at a predetermined circumferential position.

2. The transport unit according to claim 1, wherein the loading drum is provided on the outer surface with a plurality of linear guides, each aligned parallel to the axis of rotation, and wherein the loading slides are assigned to the linear guides.

3. The transport unit according to claim 1, wherein the loading slide is assigned an actuator to provide a relative movement between the loading slide and the workholder.

4. The transport unit according to claim 1, wherein a compressed air supply and/or a power supply and/or a vacuum supply is assigned to the loading drum for a movement of the loading slide along the axis of rotation and/or for a temporary adhesion of workpieces to the workholders.

5. A transport unit for transporting workpieces, the transport unit comprising a loading drum which is mounted rotatably about an axis of rotation on a bearing journal and which is provided on an outer surface with a plurality of loading slides, each loading slide being accommodated on the outer surface of the loading drum such that it can move linearly along the axis of rotation and each loading slide comprising a workholder, the workholder is provided with a recess which extends with a profile axis parallel to the axis of rotation, wherein the profile axes of the recesses each intersect a circumference arranged coaxially to the axis of rotation, wherein the workholder is received on the loading slide so as to be linearly movable in a radial direction oriented perpendicularly to the axis of rotation between a radially inner first functional position and a radially outer second functional position,
    wherein the bearing journal for the loading drum is arranged together with a pusher on a machine frame and wherein the pusher provides a linear movement along the axis of rotation onto a respective loading slide.

6. The transport unit according to claim 5, wherein the pusher comprises a linear drive with a drive housing and a drive rod which is mounted in the drive housing and is connected with an extension arm, which extension arm is aligned perpendicularly to the axis of rotation and which provides a movement coupling with the loading slide and/or the workholder and the workpiece.

7. A transport unit for transporting workpieces, the transport unit comprising a loading drum which is mounted rotatably about an axis of rotation on a bearing journal and which is provided on an outer surface with a plurality of loading slides, each loading slide being accommodated on the outer surface of the loading drum such that it can move linearly along the axis of rotation and each loading slide comprising a workholder, the workholder is provided with a recess which extends with a profile axis parallel to the axis of rotation, wherein the profile axes of the recesses each intersect a circumference arranged coaxially to the axis of rotation, wherein the workholder is received on the loading slide so as to be linearly movable in a radial direction oriented perpendicularly to the axis of rotation between a radially inner first functional position and a radially outer second functional position,
    wherein a transport system from the group: take-off drum with transport trays, chain conveyor with pick-up bars chain bars, workpiece rotary table with mandrels, workpiece rotary table with collets, conveyor belt is arranged adjacent to the loading drum.

8. The transport unit according to claim 7, wherein a circular guide track is fixed to the bearing journal, which guide track determines a guide path aligned circumferentially with respect to the axis of rotation and wherein each loading slide has a guide journal which is directed radially inwardly an is in positive engagement with the guide track along the axis of rotation, the guide track having a recess for decoupling the guide journal from the guide track at a predetermined circumferential position.

9. A transport unit for transporting workpieces, the transport unit comprising a loading drum which is mounted rotatably about an axis of rotation on a bearing journal and which is provided on an outer surface with a plurality of loading slides, each loading slide being accommodated on the outer surface of the loading drum such that it can move linearly along the axis of rotation and each loading slide comprising a workholder, the workholder is provided with a recess which extends with a profile axis parallel to the axis of rotation, wherein the profile axes of the recesses each intersect a circumference arranged coaxially to the axis of rotation, wherein the workholder is received on the loading slide so as to be linearly movable in a radial direction oriented perpendicularly to the axis of rotation between a radially inner first functional position and a radially outer second functional position,
    wherein a workpiece rotary table is mounted on a machine frame so as to be rotatable about an axis of rotation and which is equipped on a front side with mandrels which are arranged coaxially to the axis of rotation, wherein each mandrel comprises a nozzle for providing compressed air at a surface of the mandrel.

10. The transport unit according to claim 9, wherein a first coupling part of a compressed-air coupling is arranged on a rear side of the workpiece rotary table facing away from the front side, which first coupling part is connected to the nozzle via a compressed-air line, and wherein an actuator is fitted to the machine frame which has an actuator housing and an actuator element which is received in the actuator housing such that it can move linearly, wherein a movement axis of the actuator element is aligned parallel to the rotation axis and wherein a second coupling part of the compressed-air coupling is connected with the actuator element, which second coupling part can be connected to a compressed-air source and to the first coupling part to provide a compressed-air connection to the nozzle in a functional position.

11. A method for transporting circular-cylindrical profiled workpieces, comprising the steps:
    rotating a loading drum, which is provided with a loading slide on an outer surface, about an axis of rotation into a loading position for a loading slide;
    providing a workpiece from an upstream transport system to the loading slide;
    adhering the workpiece to a workholder of the loading slide;
    rotating the loading drum into an unloading position for the loading slide; and
    transferring the workpiece from the loading slide to a downstream transport system, wherein the workholder is movably mounted on the loading slide and wherein a relative movement of the workholder is carried out in a radial direction aligned perpendicularly to the axis of rotation in order to change a distance between the workholder and the axis of rotation in the loading position and/or in the unloading position,
    wherein the workpiece is pushed at the unloading position by a linear movement of the loading slide parallel to the axis of rotation onto a mandrel of a workpiece rotary table aligned parallel to the axis of rotation, and wherein a relative movement of the workholder in the radial direction is carried out during the execution of the pushing-on process, to reduce the distance of the workholder from the axis of rotation.

12. The method according to claim 11, wherein during the execution of the push-on operation, a provision of compressed air is made to a surface of the mandrel.

13. The method according to claim 11, wherein the relative movement of the workholder in the radial direction is performed for reducing the distance of the workholder from the rotation axis, when there is a predetermined overlap between the workpiece and the mandrel and/or wherein compressed air is supplied to the workholder before or at the time of the relative movement of the workholder in the radial direction for reducing the distance of the workholder from the axis of rotation.

14. The method according to claim 11, wherein, at the loading position for receiving the workpiece into the workholder, a first relative movement of the workholder in the radial direction is carried out in order to increase the distance of the workholder from the axis of rotation and subsequently a second relative movement of the workholder in the radial direction is carried out in order to reduce the distance of the workholder from the axis of rotation.

* * * * *